United States Patent [19]

Buchanan et al.

[11] Patent Number: 4,506,786

[45] Date of Patent: Mar. 26, 1985

[54] BICYCLE STORAGE STRUCTURE

[76] Inventors: Alvin E. Buchanan; James E. Buchanan, both of 5049 Whitaker Rd., Pocatello, Id. 83202

[21] Appl. No.: 530,909

[22] Filed: Sep. 12, 1983

[51] Int. Cl.³ .............................................. B65D 85/68
[52] U.S. Cl. .................................... 206/335; 217/37; 217/38
[58] Field of Search .................... 206/335; 217/37, 38

[56] References Cited

U.S. PATENT DOCUMENTS

| | | | |
|---|---|---|---|
| 542,096 | 7/1895 | Mumford | 217/37 |
| 629,049 | 7/1899 | Streat | 217/38 |
| 633,070 | 9/1899 | Bylandt-Rheydt | 217/37 |
| 2,524,260 | 10/1950 | Hutson | 206/335 |
| 3,734,272 | 5/1973 | Galen | 217/37 |

*Primary Examiner*—William T. Dixson, Jr.
*Attorney, Agent, or Firm*—Thorpe, North & Western

[57] ABSTRACT

A bicycle storage structure which includes an elongated housing with one closed end and an opening at the other end. The housing has a top and a bottom joined by spaced side panels with one or more laterally projecting members protruding from the side panels into the interior of the housing. Said members having a surface adapted to overlie the pedals of a bicycle within the housing and prevent turning of the pedals as the bicycle is withdrawn from the housing.

6 Claims, 3 Drawing Figures

BICYCLE STORAGE STRUCTURE

BACKGROUND OF THE INVENTION

The present invention relates to a bicycle storage structure and more particularly to a structure for housing and retaining a bicycle within its interior.

With the current interest in bicycling and the wide spread use of lightweight, expensive bicycles, it has become desirable to protect the vehicle from damage and unauthorized use when it is parked. To protect a bicycle while being transported or from exposure to the effects of weather, various shipping or storage containers have been proposed, such as U.S. Pat. No. 3,734,272. In addition, a variety of lockers have been proposed for installation in public places wherein bicycles can be temporarily stored to protect them against tampering or thievery. Such containers and lockers have been effective for the purposes intended, but have not been entirely suitable for all situations where storage is desirable. In cases where protection from the elements is the primary concern, ease of entry and exit from the housing is desirable. Similarly, in situations where the primary concern is to protect the bicycle from falling over or being bumped by persons or vehicles, the ease with which the bicycle can be placed in or removed from the housing is important. Particularly around a home, it is often difficult to store a bicycle where it is easily accessible and yet not subject to damage from vehicles or things being moved about or by children playing.

SUMMARY OF THE INVENTION

An object of the present invention is to provide a structure for storing a bicycle which permits ease of entry and exit.

An additional object is to provide a structure which resists tampering by children.

The above objects are realized in the present invention by provision of a structure for storing a bicycle which includes a housing open at one end, a track for guiding the wheels of the bicycle and means extending inwardly of the housing to inhibit turning of the pedals when the bicycle is withdrawn from the housing.

BRIEF DESCRIPTION OF THE DRAWINGS

The best mode presently contemplated of carrying out the invention will be understood from the detailed description of the several embodiments illustrated in the accompanying drawings, in which.

DETAILED DESCRIPTION

The bicycle storage structure of the present invention provides a housing enclosure which can be positioned or located so as to be easily accessible for wheeling or pushing a bicycle into, or withdrawing it from, the housing. The housing is so designed that withdrawal of the bicycle by a child is difficult, if not impossible.

Figure 1:
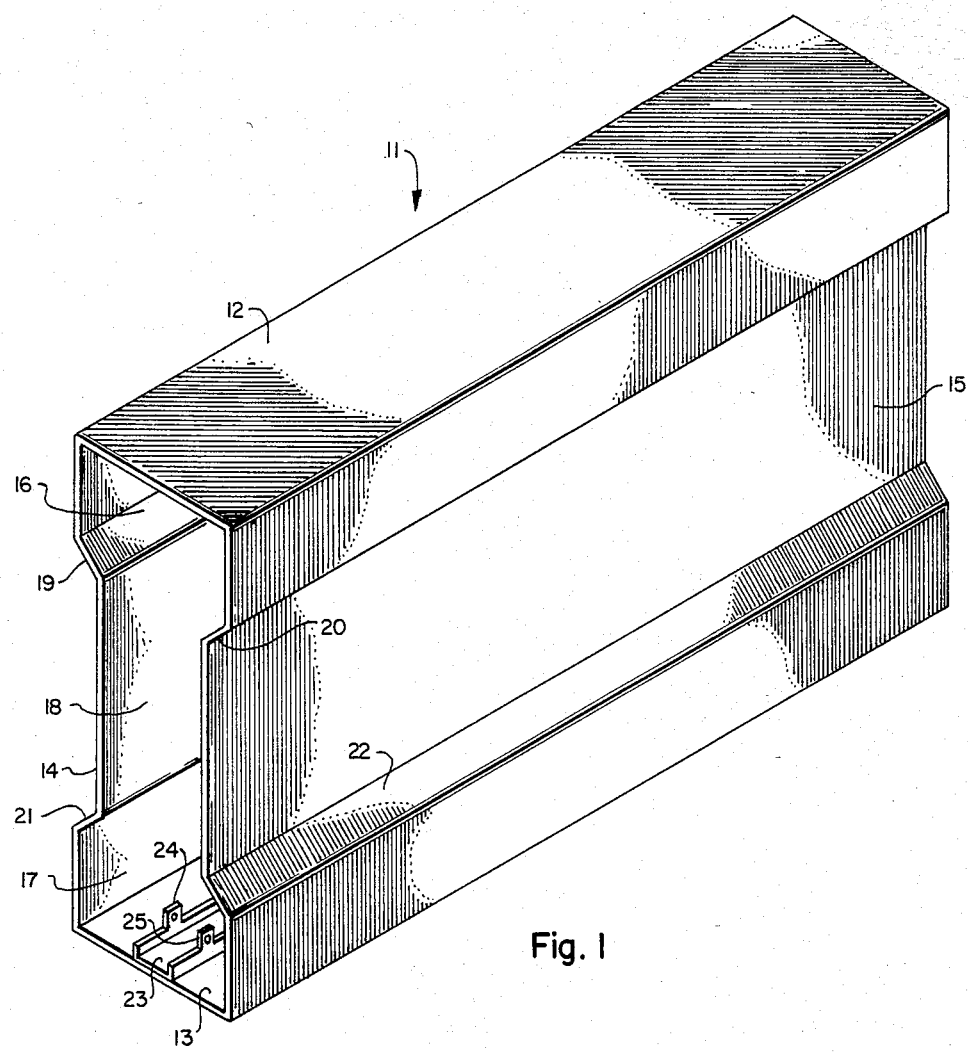
FIG. 1 is a perspective view of a bicycle storage structure according to the present invention.
Figure 2:
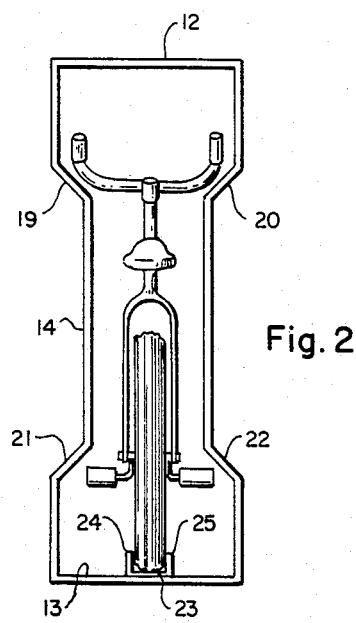
FIG. 2 is an end view of the structure of FIG. 1 with a bicycle received therein.

As illustrated in FIGS. 1 and 2 of the drawing, the present storage structure includes an elongated housing 11 which is closed at one end and open at the other. The housing includes a top 12, a bottom 13 and spaced side panels 14 and 15. The longitudinal edges of the side panels are secured to the top and bottom and extend approximately normal thereto for short distances to define an upper space 16 to accommodate the handlebars of a bicycle and a lower space 17 to accommodate the pedals thereof. The center sections of the side panels are offset toward each other to define a narrow central space 18 to accommodate the frame of the bicycle. The center sections are joined to the top and bottom edges by webs 19, 20 and 21, 22 which extend at an angle of approximately 60° to the center sections. The width of the central space 18 is such as to freely receive a bicycle therein, but at the same time, ensure that the webs 21 and 22 are of sufficient length to overlie the pedals of the bicycle when it is positioned within the housing. A channel member 23 is secured along the longitudinal centering of the bottom 13 to provide a track to guide and place the bicycle wheels. Adjacent the open end of the housing the sides of the channel are provided with narrow, vertical extensions or flanges 24 and 25 which have aligned openings therein.

In storing a bicycle within the housing, the pedals are turned so as to be essentially parallel to the ground. The front wheel is placed in the track and the bicycle wheeled or pushed into the interior until the front wheel contacts the closed end of the housing. The bicycle is then completely within the housing and fully shielded from accidental bumping or the effects of weather. To remove the bicycle from the housing, the rear wheel is lifted free of the track and the bicycle wheeled or pulled from the housing with the weight being born by the front wheel. Due to the gearing in the chain drive mechanism the pedals will turn when the rear wheel is rotated in the reverse direction. Therefore, if the bicycle is pulled without lifting the rear wheel from the track, the rear wheel will rotate, causing the pedals to turn. As the pedals turn, one or the other of them will contact and bear against the inner surface of one of the lower webs 21 or 22. Further attempts to rotate the rear wheel merely causes the pedal to bear more firmly against the web and wedge the bicycle more tightly within the housing. The bicycle can therefore not be removed from the housing by a child or anyone else who does not understand why it is being wedged within the housing.

Figure 3:
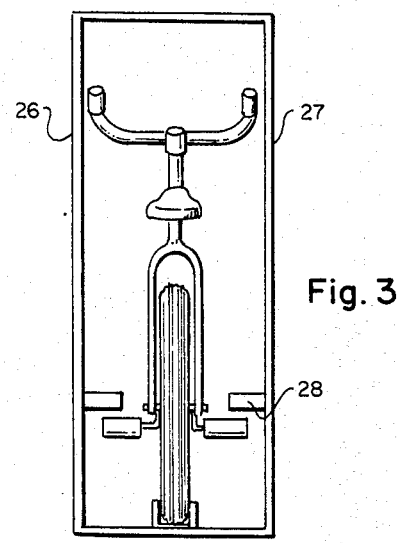
FIG. 3 is an end view of an alternative embodiment of a bicycle storage structure.

An alternative embodiment is depicted in FIG. 3 wherein the side panels 26 and 27 are straight and a longitudinal rib 28 is secured to the inner surface of one panel so as to extend into the interior of the housing. The rib is spaced from the bottom of the housing and protrudes far enough to overlie one of the pedals when a bicycle is wheeled into the housing. In this case, the pedal on the side of the rib is turned to the forward position so it will immediately be forced into contact with the rib if the rear wheel is rotated in the reverse direction. While the rib 28 is shown as being supported from one of the side panels, it is contemplated that it could also be supported from the bottom or suspended from the top if desired. Similarly, a rib can be supplied on each side of the housing.

The present structure can be formed of sheet metal or sturdy plastic and can be positioned alongside a wall or be free-standing on a deck, sidewalk or driveway. The structure can be attached to a vertical or horizontal surface by passing one or more bolts through a side panel or the bottom and securing them to the surface. A bicycle can be secured within the housing by inserting a rod or a bicycle padlock through the openings in the extensions 24 and 25 to lock the rear wheel against the track. Because only the rear of the bicycle is accessible through the open end of the housing, any accessories mounted on the handlebars, or a pack attached thereto, would be protected from tampering. If desired, a door can be fitted over the open end of the housing to keep the interior dry and clean. The structure may also be formed in ridged cardboard for interior use, temporary storage, and enclosed shipping.

While the invention has been described with reference to specifically illustrated preferred embodiments, it should be realized that various changes may be made without departing from the disclosed inventive subject matter particularly pointed out and claimed herebelow.

What is claimed is:

1. A bicycle storage structure which includes an elongated housing having an opening at one end, said housing having a width and height to accommodate a bicycle therein, and including a top and bottom joined by spaced side panels, and means protruding into the interior of the housing to prevent turning of the bicycle pedals, said means extending longitudinally of the housing and affixed to at least one side panel to protrude inwardly therefrom to overlie at least one pedal and prevent turning thereof.

2. A bicycle storage structure as defined in claim 1 wherein a track is attached to the bottom of the housing to guide the wheel of a bicycle being inserted into the housing, said track including vertically extending flanges for locking a wheel to the track.

3. A bicycle storage structure as defined in claim 1 wherein said means includes a surface which extends inwardly from each side panel, said surfaces being spaced apart to accommodate the frame of a bicycle therebetween.

4. A bicycle storage structure as defined in claim 3 wherein the surfaces are integral with the side panels and provide lateral support to the housing.

5. A bicycle storage structure comprising an elongated housing having a generally I-shaped cross section and which includes a top and a bottom joined by side panels, the upper and lower edges of each side panel extending approximately normal to the top and the bottom with the central section of each side panel offset toward each other to define spaces at the top and bottom of the housing to accommodate the handle bars and pedals respectively and a narrow central space to accommodate the frame and seat, the width of the central space being less than the width of the pedals, and wherein the upper and lower edges of the side panels are joined to the central sections thereof by angularly extending webs, the lower webs being adapted to overlie the pedals.

6. A bicycle storage structure as defined in claim 5 wherein a track is positioned on the inner surface of the bottom to guide the wheels of a bicycle, said track including vertically extending flanges for locking a wheel to the track.

* * * * *